(12) United States Patent  
Kuklinski et al.

(10) Patent No.: US 7,975,614 B2  
(45) Date of Patent: Jul. 12, 2011

(54) ACOUSTIC SHOTGUN SYSTEM

(75) Inventors: Robert Kuklinski, Portsmouth, RI (US); Thomas J. Gieseke, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 105 days.

(21) Appl. No.: 12/560,528

(22) Filed: Sep. 16, 2009

(65) Prior Publication Data

US 2011/0061554 A1 Mar. 17, 2011

(51) Int. Cl.
*F42B 15/20* (2006.01)

(52) U.S. Cl. ............................ 102/399; 367/118; 114/22

(58) Field of Classification Search .................. 102/399; 114/20.1, 22; 367/118, 131, 87; 89/5; 42/1.14
See application file for complete search history.

(56) References Cited

U.S. PATENT DOCUMENTS 3,210,877 A * 10/1965 Liberatore ..................... 42/1.14
3,545,117 A * 12/1970 Voorhees ......................... 42/59
3,721,031 A * 3/1973 Falterman et al. ............. 42/1.14
4,100,692 A * 7/1978 Cameron et al. ............... 42/1.14
7,392,733 B1 * 7/2008 Kuklinski et al. .................. 89/5

* cited by examiner

*Primary Examiner* — Benjamin P Lee
(74) *Attorney, Agent, or Firm* — James K. Kasischke; Michael P. Stanley; Jean-Paul A. Nasser

(57) ABSTRACT

A high velocity acoustic signal producing underwater shotgun system for dispersing a plurality of relatively small supercavitating projectiles over a wide spatial field at long range using the dynamics of cavity collapse for better target localization in underwater mine clearance. A typical supercavitating projectile design is enhanced to produce a two-staged projectile in order to accomplish this innovation. The first stage of the two stage design allows for the long range firing underwater typical of a supercavitating projectile while the second stage permits the coverage of a wide area with a plurality of small supercavitating projectiles just as the first stage projectile reaches its fixed range. A distinctive feature of the radiated noise from a supercavitating projectile contacting a solid object is used in conjunction with the two stage projectile design to provide a system for underwater mine clearance verification. The distinctive noise signal may also be used in conjunction with an underwater targeting system to help identify, localize and track targets as well.

9 Claims, 3 Drawing Sheets

ACOUSTIC SHOTGUN SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to a high velocity acoustic shotgun system and more particularly to a method and apparatus for dispersing a plurality of relatively small, supercavitating projectiles in the water over a wide spatial field at long ranges from an underwater gun or surface gun.

(2) Description of the Prior Art

One major technical challenge related to employing supercavitating projectiles against targets is the need to accurately determine the location of a target object when it is positioned at a substantial distance from the launch device. Even small errors in the target bearing solution will result in a miss of the object. To overcome this known problem, multiple rounds of projectiles have usually been fired in bursts. Firing projectiles in bursts, however, necessitates using rapid firing rates and also requires the use of copious amount of ammunition. In addition, the mechanical design of such a gun system becomes much more complex and the utility of the gun system accordingly is more limited.

A second problem common to supercavitating projectiles is the configuration of the projectile itself. The primary design choice involves making tradeoffs between using heavier projectiles which generally result in increased range, or using lighter initially higher velocity projectiles that slow down more rapidly and are thus range limited. For a particular system to be effective a critical projectile speed and mass must be selected in order to neutralize a target at a given range.

In addition to the two projectile related difficulties described above, another obstacle encountered by rapid mine clearance systems is the obtaining of a reliable indication that the mine has in fact been disabled. The existing approach to resolving this quandary requires the use of scuba divers or deployment of a remote camera. In either of these cases the mine disablement confirmation often turns into a tedious, time consuming process.

What is needed is a way to overcome the inherent problems associated with long range gun system accuracy, projectile mass and velocity design choice considerations, and mine system clearance verification difficulties by providing a means for accurately dispersing multiple projectiles at significant range while providing a reliable acoustic means to detect target impacts thereby and either indicate an object's presence in particular volume or lack thereof.

SUMMARY OF THE INVENTION

Accordingly, it is a general purpose and object of the present invention to provide a system employing supercavitating projectiles operating so as to allow efficient mine clearance or platform self defense at a great distance from a launch platform.

It is a further object that the above general object is accomplished using a two stage high speed supercavitating projectile with a traditional first stage and a second stage having a plurality of small pellet like projectiles capable of simultaneous dispersal at supercavitation speed when the first stage projectile nears its maximum range.

A still further object is that both the first stage projectile and the plurality of second stage pellets be entrained in vaporous cavities owing to the supercavitation effect of high speed motion.

Still another object is to utilize the distinctive noise signatures produced by suddenly collapsing vaporous cavities about the second stage pellets upon solid object impact in conjunction with an underwater acoustic targeting system to detect and track target objects.

These objects are accomplished with the present invention by providing a high velocity, acoustic signal producing underwater shotgun system that disperses a plurality of relatively small supercavitating projectiles over a wide spatial field at a long distance from the shotgun. The system relies upon the dynamics of cavity collapse for better target localization in underwater mine clearance operations. To reach this objective, a typical single stage supercavitating projectile design is enhanced to produce a two-staged projectile. The first stage of the two stage design allows for the long range firing underwater typical of a supercavitating projectile while the second stage permits the coverage of a wide area with a plurality of small supercavitating projectiles just as the first stage projectile reaches its fixed supercavitation range limit. A distinctive acoustic feature of the radiated noise from a supercavitating projectile impacting a solid object is used in conjunction with the two stage projectile design to provide a system for underwater mine clearance verification. This distinctive noise signal may also be used in conjunction with an underwater targeting system to help identify, localize and track targets as well.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Accurate localization of underwater targets is a major technical challenge for a variety of underwater systems. Target identification usually relies on the transmission of an acoustic signal from a fixed location and processing of a return echo at that same location. This invention in its most basic form uses a supercavitating projectile fired from a fixed location to produce a radiated acoustic signal upon impact at the location of the targeted object. The radiated acoustic signal either has greater amplitude or is easier to characterize than would be a signal transmitted from the receiver location. Previous approaches used the noise generated by a prior art projectile supercavity as a traveling noise source. This invention uses the dynamics of cavity collapse to produce a much greater radiated noise signature and in so doing producing much better target localization information.

A series of experiments were performed to quantify the radiated noise signature from underwater projectiles. The experiments showed that cavity collapse dynamics produced unique characteristic signatures. The present invention modifies the basic supercavitating projectile design to greatly enhance the production of those unique characteristics. Having incorporated these features into the projectile design, a "staged acoustic shotgun tracer bullet" has been created. This projectile may then be used in an existing gun to augment targeting. Thus, as in the case of an in-air tracer bullet, some of the novel projectiles may be used in a rapid-fire gun configuration to localize the proximity of the standard projectile stream on the intended target.

Figure 1:
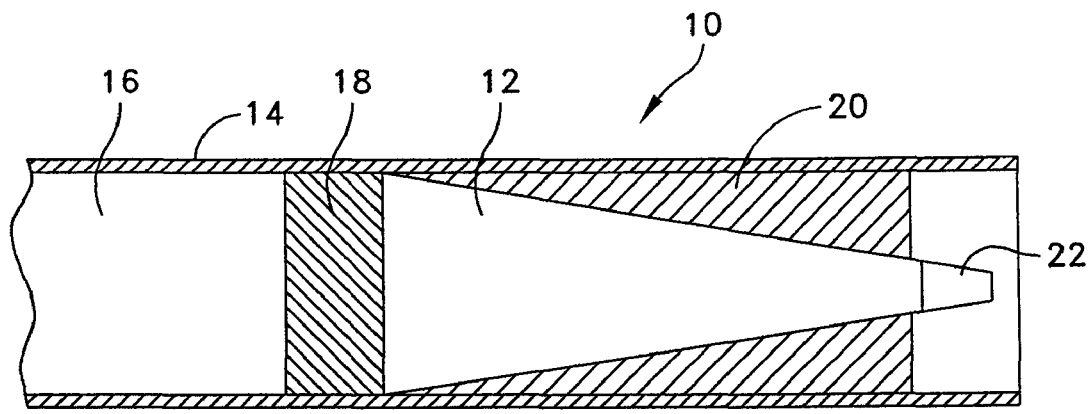
FIG. 1 shows a typical prior art supercavitating projectile launch system.

FIG. 1 shows a traditional supercavitating projectile gun system generally indicated as 10. A tapered cylindrical projectile 12 is housed in a cylindrical gun barrel 14. Within barrel 14 a cylindrical charge 16 at the aft end of the barrel propels both projectile 12 and a cylindrical metal pusher 18 forward. The metal pusher 18 allows the pressure in barrel 14 to rise in a desired manner and to accelerate projectile 12 without any deformation in the projectile's shape. To ensure the projectile smoothly transverses barrel 14 a tapered cylindrical sabot 20 is used to fill the space between the inside diameter of barrel 14 and the tapered outer surface of projectile 12. The sabot is typically constructed of lightweight foam-like material. Sabot 20 separates and falls away upon projectile 12 water entry. A cavitator tip 22 is affixed to the front of projectile 12. Tip 22 and the high speed transit of projectile 12 in the water environment due to the force produced by charge 16 produces a region of water vapor around projectile 12 called a vaporous cavity. The complete envelopment of projectile 12 within this vaporous cavity is termed "supercavitation".

The supercavity so formed terminates in a cavity closure region aft of the projectile. The cavity closure region is usually well defined spatially but is not steady. Quasi-steady rupture of the cavity closure region produces a trail of small water vapor bubbles behind the closure point. The bubbles in the wake ultimately collapse to produce a large amplitude radiated acoustic signature. The entire grouping of cavitator tip 22, near stable supercavity and trailing collapsing bubble cloud advects through the water at the speed of the cavitator tip. The radiated signal from the supercavitating projectile 12 is very predictable for a wide range of projectile geometries and subsonic speeds.

A projectile's supercavity tends to be upwards of 20 feet long. The usual major source of noise that the supercavity produces is from the collapsing bubbles in the wake of the supercavity. The supercavity itself acts to baffle noise propagating in the forward direction in the vicinity of the projectile trajectory. This baffling of the forward propagating sound and the time delay associated with the cavity length explains the main features of the typical projectile's radiated noise signature.

When a projectile strikes an object however, the cavity collapse continues to proceed from well aft of the projectile strike toward the impact location. Note that a premature cavity collapse produces acoustic noise that is significantly higher in amplitude than a non-impact collapse. Thus, if a supercavitating projectile strikes an object, a characteristic pulse of approximately 5 ms duration is observed at the impact location. The time delay in when that pulse is observed is a function of supercavity length and projectile speed. Similar signals have been associated with different sized projectiles including small pellet-like projectiles.

Figure 2:
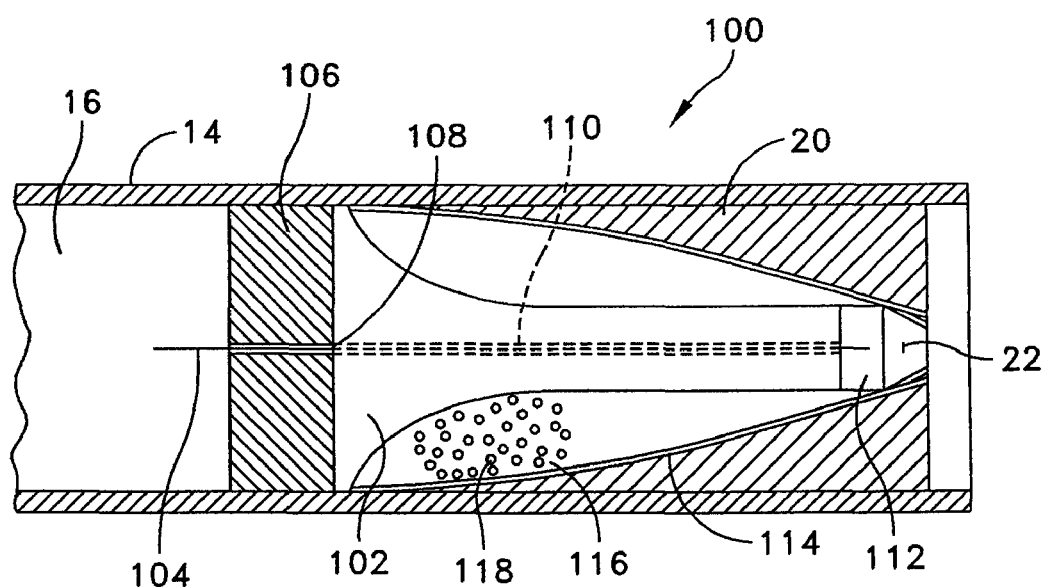
FIG. 2 shows an embodiment of a shotgun super-cavitating projectile launch system built according to the teachings of the present invention.

The preferred embodiment of the present inventive system, generally identified as 100, is shown in FIG. 2. System 100 includes a gun barrel 14, a propellant charge 16, a projectile further generally identified as 102, a pusher 104 and sabots 20. Projectile 102 includes an elongated cylindrical structure 106 having a concave surface 106a, a combustion chamber 108 at the forward end of structure 106 containing a small explosive charge, a cavitator tip 22 forward of chamber 108, a convex outer foam cover 110 extending from the aft end of structure 106 to the forward end of tip 22, a core region fuse 112 passing through a central aperture 114 in structure 106 and into chamber 108, an interior volume 116 created between the concave surface 106a of structure 106 and the interior surface of convex cover 110, and a plurality of pellets 118 filling interior volume 116. Core region fuse 112 is constructed of a flammable material. Fuse 112 also passes through an aperture 120 in pusher 104 and into charge 16. Upon launch command the flammable propellant charge 16 in barrel 14 is ignited. Combustion of the propellant charge 16 further causes a flame front to move in a timed manner along fuse 112 from the projectile aft section through aperture 120 in pusher 104 and on through aperture 114 in concave structure 106 into combustion chamber 108. As the flame front reaches small combustion chamber 108 near the end of the projectile's expected travel, a small explosion occurs. The explosion causes cavitator tip 22 to separate from projectile 102 and permits the external water flow to contact convex foam cover 110. Foam cover 110 is ripped away from the projectile by the water exposing interior volume 116. Interior volume 116 contains the large number of shotgun-like pellets 118, which then disperse over a wide area. These pellets can be similar to conventional shotgun pellets. Due to the high initial pellet velocity at the time of cavitator tip 22 ejection, a small supercavity will envelop each pellet. The rate of flame front propagation from charge 16 to combustion chamber 108 will determine the range from the gun barrel where pellet separation takes place. The overall design of the shotgun projectile is shown to fit substantially within the same gun barrel volume as did the prior art projectile.

Figure 3:
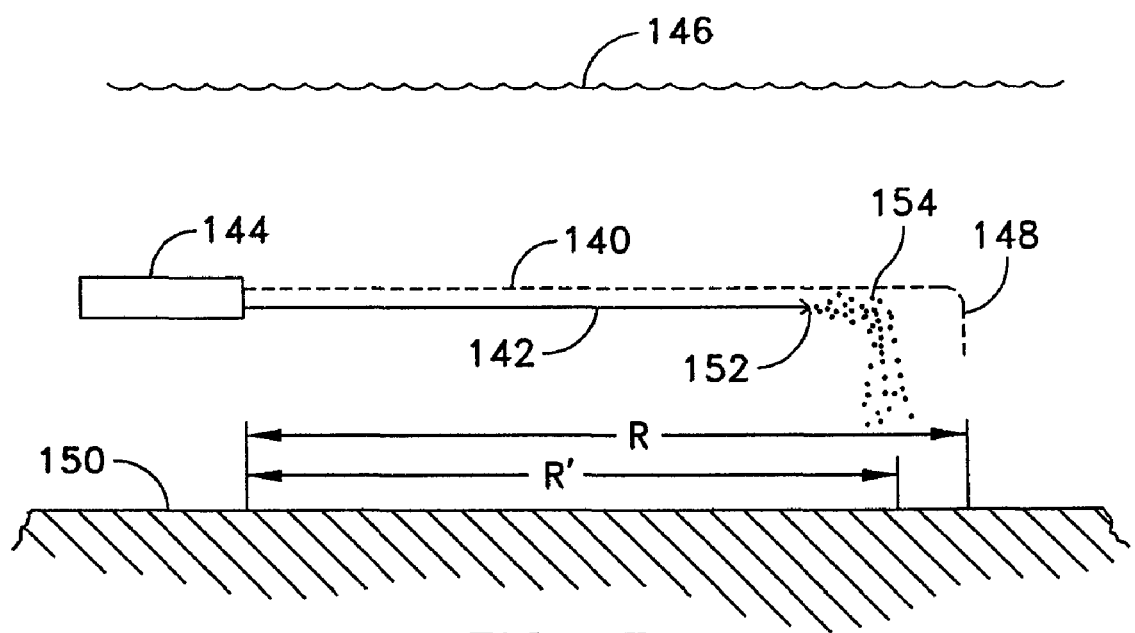
FIG. 3 shows a comparison of the trajectories of a prior art projectile and the novel shotgun projectiles of the present invention.

FIG. 3 shows a side view comparison of the trajectories 140 and 142 of the prior art projectile 12 and the instant invention projectile 102 respectively. An underwater gun 144 launches a prior art projectile 12 along trajectory 140 through water medium 146. The prior art projectile follows trajectory 140 for a distance R at which point the projectile speed has slowed sufficiently to cause the supercavity to collapse and a rapid slowing of the projectile ensues along a tumbling trajectory 148, the projectile falling until it reaches ocean floor 150. Note this behavior does not produce a high amplitude noise. In the case of the preferred embodiment projectile 102, before the critical slow down range R' is reached the small explosion occurs at the point designated as 152. At that point multiple trajectories 154 develop and each terminate after a relatively short distance (approximately (R-R')). It is noteworthy that the total range of the device of the instant invention is slightly shorter than that of the prior art device. The prior art device acts to optimize range for a fixed mass projectile while the instant invention act to optimize target detection.

Figure 4:
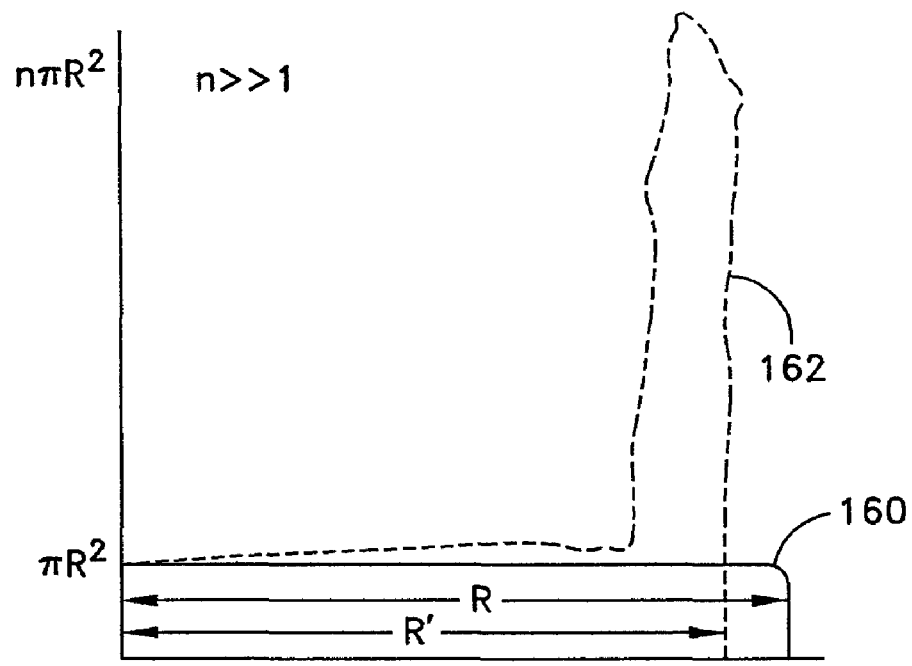
FIG. 4 shows the likelihood of striking an object with both a conventional projectile and the novel pellet projectiles of the present invention.

FIG. 4 shows a comparison of the likelihood of striking an object using each of the projectiles of FIG. 3. The probability trace 160 for the prior art projectile along the entire trajectory is associated with the projected area of the projectile. The instant invention case demonstrates the greatly expanded likelihood of hitting an object near range R' as shown by trace 162.

Figure 5:
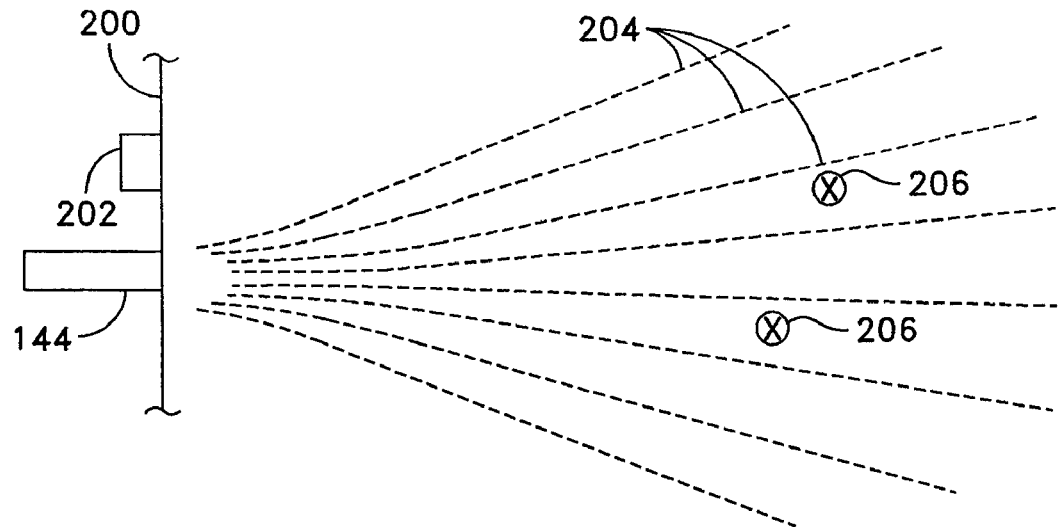
FIG. 5 shows a top view of how a prior art gun system would operate against a number of fixed targets when the gun is fired from a stationary platform.
Figure 6:
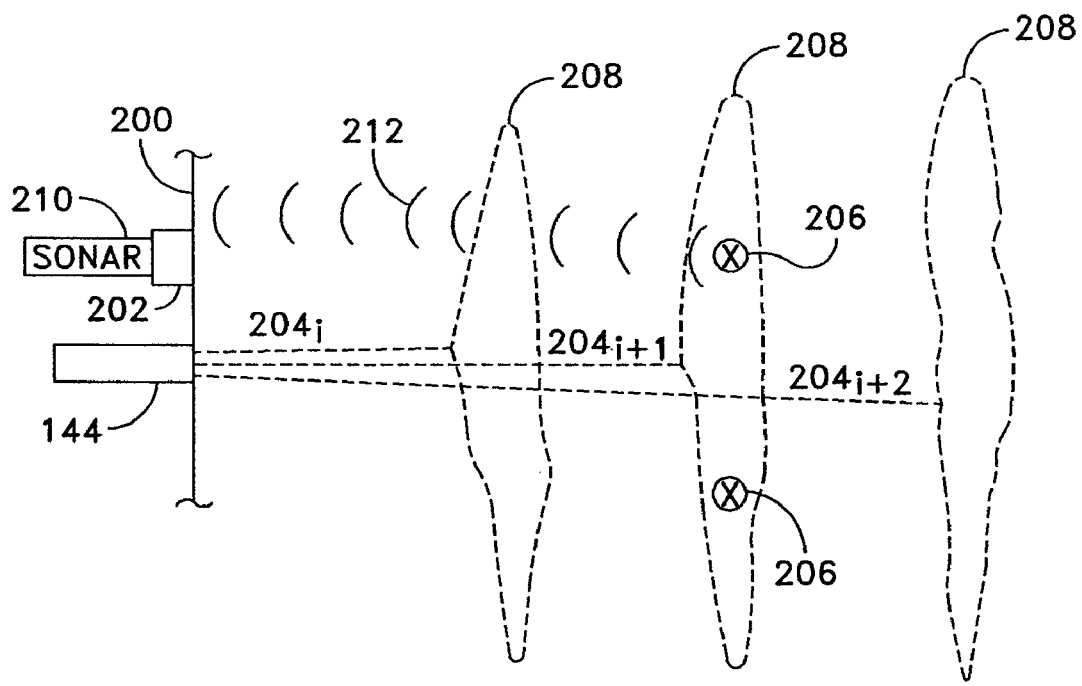
FIG. 6 shows a top view of how a gun system built according to the teachings of the present invention would operate against a number of fixed targets when the gun is fired from a stationary platform.

FIG. 5 shows how a prior art gun system would operate against a number of fixed targets when fired from a platform 200 housing gun barrel 144 and a sensor 202 and FIG. 6 shows how an instant invention gun system would operate against a number of fixed targets when fired from a platform 200 housing gun barrel 144 and a sensor 202. In the prior art case a spray pattern including individual trajectories 204 would be attempted to try to strike targets 206. As the range of targets 206 increases, the likelihood of success diminishes. Also, without a preprogrammed search for the telltale 5 ms return from an impact cavity collapse there is no indication of success. In the case of FIG. 6 a number of projectiles designed for slightly different ranges are fired along trajectories 204$i$, 204$i$+1 and 204$i$+2. Pellet spread patterns 208 provide wide coverage volumes at each distance from gun barrel 144. This results in a small number of projectiles covering a large area along and across trajectory 204. The present inventive system is much more efficient in terms of total projectiles expended if knowledge of object range is available. The problem of a small error in a range targeting system has little impact on the implementation of this system. In addition the instant invention system contains a sonar system 210 that receives the sensed data from sensor 202 and searches for target hit returns 212, adjusting the ensuing projectile firing trajectories in response.

The primary advantages of the acoustic shotgun system are many and varied including: the ability to produce a pattern of supercavitating projectiles over a wide area from a single round; the ability to control the dispersion area; the ability to control the range over which this dispersion occurs; the ability to accurately determine projectile misses and hits; the means to produce a targeting solution and firing that minimizes the effects of single projectile dispersion; the use of cavity collapse upon impact to produce radiated projectile noise; the ability to operate in an existing gun system; improved ability to cover a larger volume with supercavitating projectiles; improved determination of the track of an underwater object; the ability to detect supercavitating projectile impacts; better resolution of underwater objects and tracks in poor acoustic environments; more efficient mine clearance operation; better ability to engage multiple targets; and, more efficient use of projectile volume and hence improved overall gun system efficiency.

What has thus been described is a system of supercavitating projectiles and operating procedures that enable efficient mine clearance or platform self defense at great distance from a launch platform. This is accomplished with the present invention by providing a high velocity, acoustic signal producing underwater shotgun system that disperses a plurality of relatively small supercavitating projectiles over a wide spatial field at a long distance from the shotgun. The system relies upon the dynamics of cavity collapse for better target localization in underwater mine clearance operations. To reach this objective, a typical single stage supercavitating projectile design is enhanced to produce a two-staged projectile. The first stage of the two stage design allows for the long range firing underwater typical of a supercavitating projectile while the second stage permits the coverage of a wide area with a plurality of small supercavitating projectiles just as the first stage projectile reaches its fixed supercavitation range limit. A distinctive acoustic feature of the radiated noise from a supercavitating projectile impacting a solid object is used in conjunction with the two stage projectile design to provide a system for underwater mine clearance verification. This distinctive noise signal may also be used in conjunction with an underwater targeting system to help identify, localize and track targets as well.

Obviously many modifications and variations of the present invention may become apparent in light of the above teachings. A number of alternative devices could be constructed using the same general methods discussed herein to construct devices that would be optimized for a particular purpose. For example: the projectile shape and size is not limited as shown; the teachings of this invention may be used to design projectiles with different ranges, calibers, and different pellet patterns; any number of pellet shapes can be used; the projectile structural core design is not unique, alternative cover materials and shapes could be used to enclose the shotgun pellets within the projectile; multiple projectiles could be fired from a Gatling gun analogous to tracer bullets in addition to prior art projectiles to provide a near continuous closed loop targeting system; the projectiles could be designed with any number of enclosed pellets and different size enclosed volumes to produce different dispersion patterns; and, different flammable core materials could be used.

In light of the above, it is therefore understood that within the scope of the appended claims, the invention may be practiced otherwise than as specifically described.

What is claimed is:

1. An acoustic shotgun system comprising:
   a tapered underwater projectile capable of operating at supercavitation speed, said supercavitating projectile having disposed therein a plurality of pellets;
   a cylindrical gun barrel for holding and firing said underwater projectile, said gun barrel having an inside diameter sized to accommodate said tapered underwater projectile;
   a sensing means positioned underwater adjacent said gun barrel, for detecting and transmitting said acoustic signal from said pellets;
   a sonar system attached to said sensing means, capable of receiving said transmitted acoustic signal from said sensing means and determining therefrom the range and position of a target;
   a cylindrical pusher, disposable in said gun barrel aft of said projectile in contact therewith, for exerting a motive force upon said projectile sufficient to produce supercavitation thereof;
   a first explosive charge, positioned aft of said pusher, for controllably exerting upon detonation said motive force against said pusher; and
   a tapered foam sabot, surrounding the tapered portion of said projectile in said gun barrel, for providing moveable support to said projectile during launch.

2. The shotgun system of claim 1, wherein said pusher has a central aperture passing therethrough from forward to aft and wherein said projectile further comprises:
   a concave tapered core structure, said taper running aft to forward, said core structure further having a central aperture passing therethrough from forward to aft;
   a combustion chamber, fixedly attached to the forward end of said core structure;
   a second explosive charge housed in said combustion chamber;

a convex foam cover disposed over said core structure and said combustion chamber, for creating an interior volume therebetween to house said plurality of pellets;

a cavitator tip fixedly attached at the forward extreme of said core structure, said combustion chamber and said foam cover; and a fuse disposed between said first explosive charge at the aft end of said barrel and said second explosive charge in said combustion chamber, said fuse passing through said pusher central aperture and said tapered core structure central aperture such that upon ignition of said first explosive charge said fuse lights and controllably propagates a launch timing flame front therethrough into said combustion chamber igniting said second explosive charge for dispersing said plurality of pellets from said projectile at a preselected time after launch.

3. The shotgun system of claim 2, wherein said plurality of pellets are of uniform size.

4. The shotgun system of claim 3, wherein said acoustic signal sensing means is a hydrophone.

5. The shotgun system of claim 4, wherein said cylindrical gun barrel is disposed underwater.

6. The shotgun system of claim 4, wherein said cylindrical gun barrel is disposed on a surface platform.

7. A method for localizing the range and bearing of a distant underwater object, the method comprising the steps of:

firing a preselected number of supercavitating projectiles sequentially from a gun with each projectile tracking along substantially the same trajectory, each projectile further being preset to disperse a plurality of supercavitating pellets stored therein over a wide volume pattern that spreads orthogonal to said trajectory at a unique, pre-selected range from said gun, the plurality of volume patterns thus produced by said corresponding supercavitating projectile further being closely spaced along said trajectory, whereby a small number of projectiles thus serve to cover a large volume along and across said trajectory;

sensing acoustic signals produced by supercavitating pellet impact with said distant object using an acoustic sensor located proximate said gun, said pellet impact producing a detectable characteristic bubble collapse signature return of higher amplitude and distinctive pulse length that is easier to detect than a standard sonar echo; and processing said acoustic signal return data using a signal processing sonar system connected to said acoustic sensor to search for object range and bearing data from said bubble collapse returns.

8. The method according to claim 7, wherein each said bubble collapse produces a distinctive acoustic noise pulse return of 5 ms duration.

9. The method according to claim 8, wherein each said multi-pellet projectile is fired as part of a stream of standard supercavitating projectiles for use as a tracer bullet in directing the flow of standard projectiles upon said target by adjusting ensuing projectile firing trajectories in response to said object range and bearing location data.

* * * * *